Aug. 16, 1927.

H. F. WESTRICK 1,639,358

CULTIVATOR ATTACHMENT

Filed July 16, 1926

H. F. Westrick
INVENTOR

BY Victor J. Evans
ATTORNEY

WITNESS:

Aug. 16, 1927.

H. F. WESTRICK

CULTIVATOR ATTACHMENT

Filed July 16, 1926

E. P. Ruppert.

WITNESS:

H. F. Westrick
INVENTOR

BY Victor J. Evans
ATTORNEY

Patented Aug. 16, 1927.

1,639,358

UNITED STATES PATENT OFFICE.

HENRY F. WESTRICK, OF NEW POINT, INDIANA.

CULTIVATOR ATTACHMENT.

Application filed July 16, 1926. Serial No. 122,895.

This invention contemplates the provision of a cultivator attachment designed to pulverize all of the clods of dirt with which it comes into contact, and to mulch the soil when arranged in one position with relation to the cultivator shovel and further designed to cut and destroy weeds when its position is reversed.

The nature and advantages of the invention will be better understood when the following detailed description is read in connection with the accompanying drawings, the invention residing in the construction, combination and arrangement of parts as claimed.

In the drawings forming part of this application, like numerals of reference indicate similar parts in the several views, and wherein.

Figure 1:
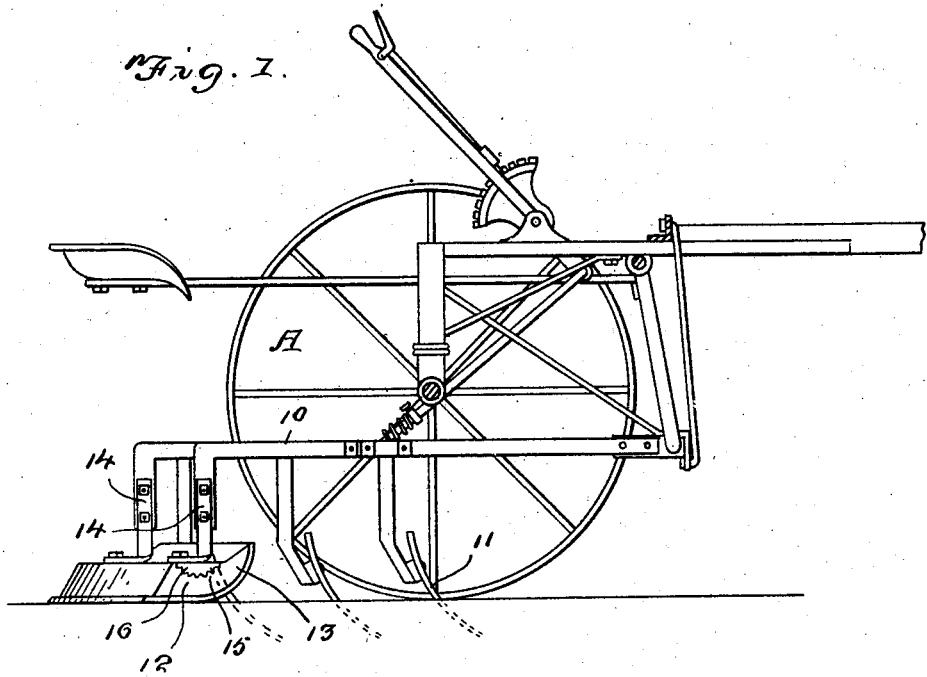
Figure 1 is a side elevation of a cultivator showing the attachment associated therewith.

Referring to the drawings in detail, A indicates generally a cultivator of any well known construction, and wherein 10 represents the frame. Depending from the frame 10 and supported thereby in any suitable manner are the cultivator shovels 11.

Figure 2:
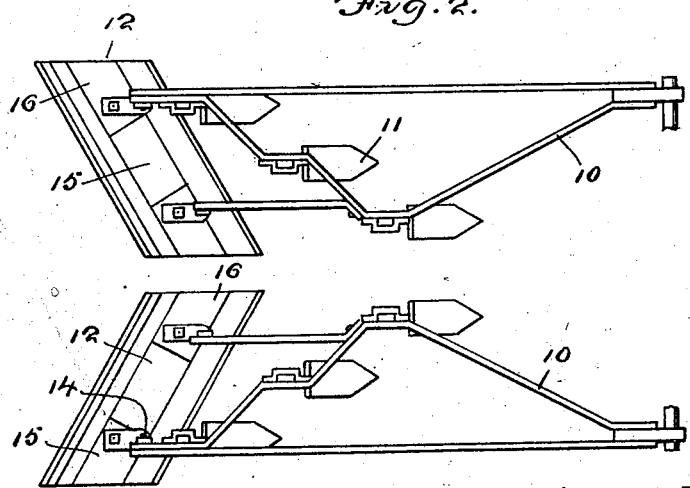
Figure 2 is a plan view of the attachment showing its relation with the cultivator shovels.
Figure 3:
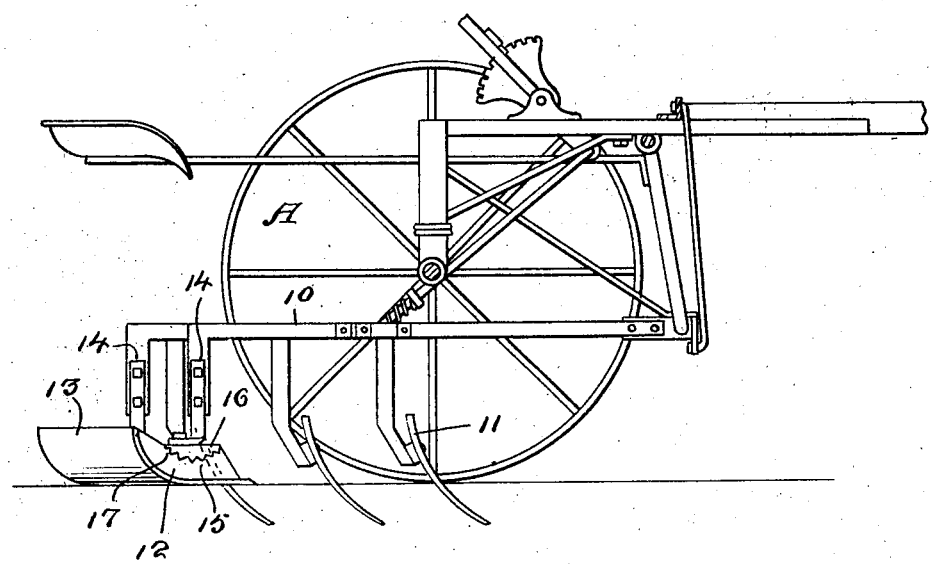
Figure 3 is a view similar to Figure 1 showing the attachment in reversed position with relation to the position which it occupies in Figure 1.
Figure 4:
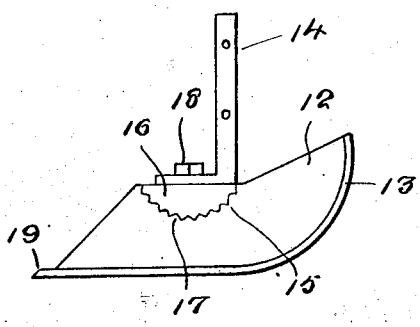
Figure 4 is a view in elevation of the attachment.
Figure 5:
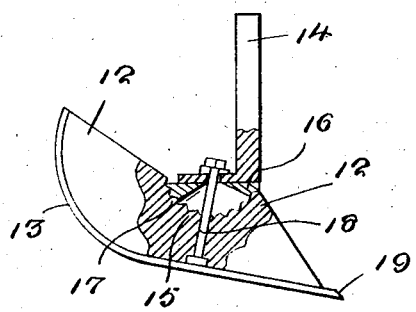
Figure 5 is a sectional view therethrough.

The invention is in the nature of an attachment and consists of one or more ground engaging members of the outline shown in Figures 1 and 2. In Figure 2 there are shown two of these members which are identical in construction, and each member being in the nature of a block 12 having a flat bottom and an upwardly curved end wall 13. Each block is supported by the frame 10 through the instrumentality of bracket arms 14 which are suitably secured to the frame as shown in Figure 1. The top of each block 12 is recessed as at 15 to receive a similarly shaped strip 16 supported by the bracket arms 14. The curved or under surface of this strip 16 is formed with teeth 17 which bite into the wall of the recess 15 to assist the fastening element 18 in holding the ground engaging member or block 12 at any desired angle or degree of inclination with respect to the ground in the manner shown in Figure 5. The fastening bolts 18 are embedded in each block 12, and pass upwardly through slots in the strip 16 and also through openings in the bracket arms 14, to permit the ground engaging members or blocks to be arranged at different angles with relation to the ground as stated. It will be noted from an observation of Figures 4 and 5 that the block or ground engaging member 12 can be arranged in different positions with relation to the cultivator shovels 11, depending upon the particular use to which the attachment is to be put. The block 12 is extended at one end and bevelled to provide a cutting blade 19 which is adapted to be arranged directly behind the cultivator shovels 11 and at a proper inclination to the ground or surface, and thus used for cutting and destroying weeds of a character that cannot be easily taken out of the ground with a shovel or the like. The attachment may be arranged in the manner shown in Figure 1, wherein the curved end wall 13 is arranged directly behind the cultivator shovels 11, in which position the attachment is used to pulverize all clods of dirt and to mulch the soil in order to retain within the ground as much moisture as possible which is very essential to growing crops.

While it is believed that from the foregoing description, the nature and advantages of the invention will be readily apparent, I desire to have it understood that I do not limit myself to what is herein shown and described, and that such changes may be resorted to when desired as fall within the scope of what is claimed.

Having thus described the invention, I claim:

1. A cultivator attachment comprising a ground engaging member having a flat bottom terminating to provide a cutting edge at one end, and an upwardly curved wall at the opposite end, and means for supporting said member for both tilting and turning movements, whereby either end may be arranged directly behind the cultivator shovel at the desired inclination to the ground.

2. A cultivator attachment comprising a ground engaging member having a flat bottom and a curved end wall, a cutting blade projecting from the other end of said member, and means for supporting the member from the frame of the cultivator, with either end of the member arranged directly behind the cultivator shovels for the purposes specified.

3. A cultivator attachment comprising a ground engaging member having a flat bottom and a curved end wall, a cutting blade projecting from the other end of said member, means for supporting said member from the frame of the cultivator with either end of said member arranged directly behind the cultivator shovels, and means whereby said member can be arranged and held at different inclinations with relation to the ground.

In testimony whereof I affix my signature.

HENRY F. WESTRICK.